June 14, 1949.  G. P. RUHL  2,473,261
TRANSPLANTER
Filed June 4, 1945  2 Sheets-Sheet 1
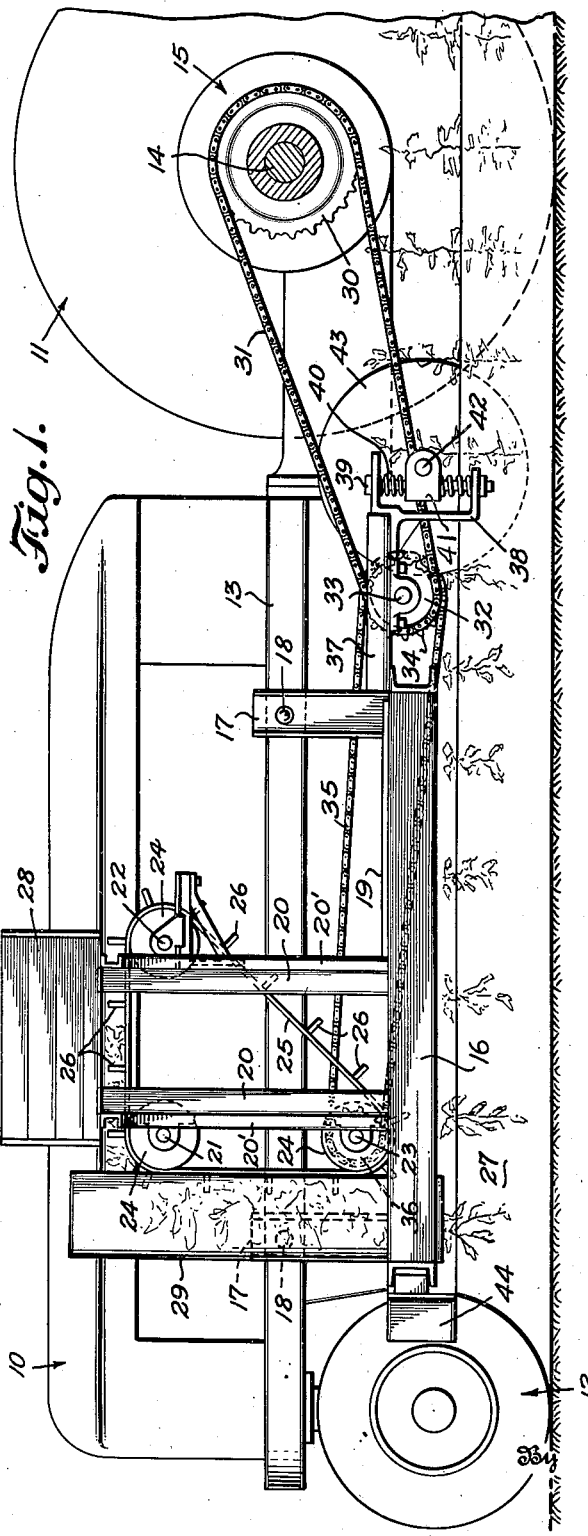
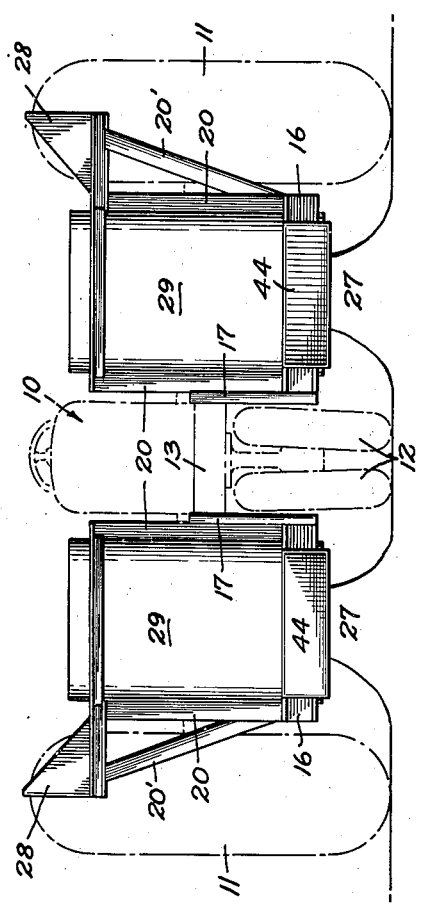
Inventor
G. P. Ruhl
By
A. Yates Dowell.
Attorney

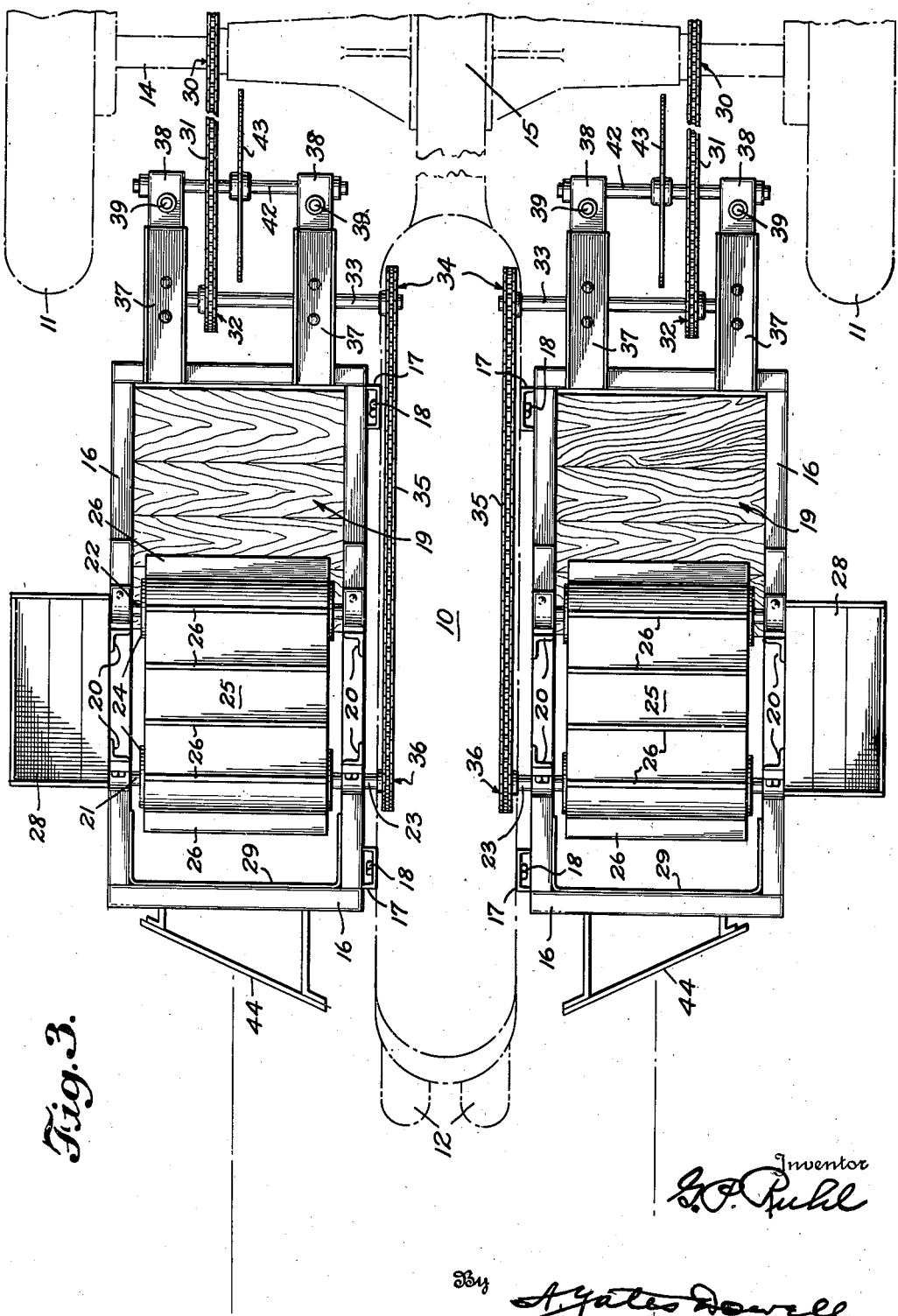

Patented June 14, 1949

2,473,261

UNITED STATES PATENT OFFICE 2,473,261

TRANSPLANTER

Guy P. Ruhl, Frostproof, Fla.

Application June 4, 1945, Serial No. 597,439

1 Claim. (Cl. 111—3)

This invention relates to agricultural implements, and more particularly to a device for transplanting small plants, as for example, live sweet potato vines in prepared beds or rows.

It is desirable to obtain the greatest production in the shortest period of time, and the weather and seasons are controlling factors. Accordingly, plants are grown in hotbeds and protected until they are ready for transplanting. Transplanting from a hotbed to the prepared beds or rows has been a serious problem, due to the fact that it required much time and effort.

It is an object of the invention to provide equipment by means of which small plants may be simply and rapidly transplanted.

A further object of the invention is to provide structure applicable to a modern tractor which structure is of simple, inexpensive, and satisfactory character particularly suitable for transplanting.

Another object of the invention is to provide transplanter structure which may be used without a tractor, as for example, pulled by animals or propelled in any desired manner, or a transplanter which may be used in gangs in connection with a source of propulsion.

A further object of the invention is to provide a transplanter capable of planting one or more rows simultaneously.

Briefly, the invention contemplates a conveyor with a horizontal run on which plants from the hopper are selectively placed by hand, by means of which conveyor the plants are dropped across a row or bed and a resiliently mounted wheel rolls over the center of the plant and presses the same into the soil so that it will grow. The machine is particularly suited for sweet potatoes which have the faculty of taking root easily.

Further objects and advantages of my invention will be apparent from the following specification taken in conjunction with the accompanying drawings, wherein:

Figure 1 is a side elevation illustrating one application of the invention;

Fig. 2, a front elevation; and

Fig. 3, a top plan view.

Referring to the drawings, a conventional tractor 10 is employed for supporting the transplanting mechanism, although instead of a self-propelled vehicle, any other type of vehicle may be employed. The vehicle on which the transplanter is mounted includes traction wheels 11, with guiding or steering wheels 12, and a frame 13. The vehicle may be provided with the usual rear axle 14, and a differential housing 15. Mounted at each side of the vehicle is a transplanter structure or unit for intermittently dropping the vines planted in a row.

Each transplanter unit includes a rectangular frame 16, supported by upright brackets 17, secured by fasteners 18, to the frame 13. On the rectangular frame 16 is mounted a platform 19, adapted to support a person to feed vines to the machine at each side of the tractor. Four uprights 20 are mounted on each of the frames 16. These uprights adjacent their upper ends support parallel shafts 21 and 22, and adjacent their lower ends near the platform 19 they support a shaft 23. On these shafts are mounted rollers or drums 24, about which an endless belt or conveyor 25 is adapted to travel.

The conveyor 25 is provided with spaced cleats or projections 26 between each adjacent pair of which on the conveyor is adapted to be placed a plant to be transplanted. The upper run of the conveyor is disposed in substantially horizontal position so that the plants may be easily placed between the spaced cleats or projections, while the forward run of the conveyor is disposed in substantially vertical position or a position inclined rearwardly slightly from the vertical, so that the plants may be supported by the cleats or projections of the conveyor until each plant is discharged in close proximity to the prepared row or bed 27. Accordingly, as each plant is placed upon the conveyor it will be carried forwardly and lowered and allowed to drop by gravity as it approaches the lowermost travel of the conveyor. The forward upright run of the conveyor is protected by a shield 29 mounted on the frame 16.

A hopper or receptacle 28 is provided for each transplanting unit for containing the plants prior to their being placed upon the respective conveyor by hand, although, if preferred, the invention contemplates mechanical means for this purpose. The hopper or receptacle 28 may be provided with additional supporting braces 20 to strengthen the same.

Power for operating the conveyor 25 may be derived from the rear axle 14 by means of chain and sprocket drives. A sprocket 30 may be mounted on the rear axle and by means of a chain 31 and sprocket 32 drive a shaft 33. On the shaft 33 is mounted a second sprocket 34 which drives a chain 35 which extends around and drives a sprocket 36 on the conveyor shaft 23.

The intermediate shaft 33 is supported by auxiliary frames 37 attached to the frame 16. The rear portions of the auxiliary frames 37 are provided with brackets 38 having vertical guide pins 39, on which are supported by means of springs 40, vertically moving bearings 41. Each of the bearings 41, on account of the resiliency of the springs 40 can move relative to the frames 37.

In the bearings 41 is mounted a transverse shaft 42 carrying a wheel 43 located in a manner to pass over the plants deposited from the machine, and embed their stems in the row or bed 27. This wheel is relatively thin and rounded at its periphery in order not to injure the plants, and yet press them into the soil in a manner such that they will readily take root.

Directly in front of the plant guiding shield 29 is located a scraper or strike-off mechanism 44, attached to the frame 16. This scraper or strike-off device is operated at the proper height so that the soil and the height of the wheel 43 will be in proper cooperative relation. Also, the strike-off will level the soil so that it will have a flat, wide, surface, so that the vines will not roll off when they are dropped thereon.

With the structure described, a transplanter provided for transplanting two rows at a time with the vines spaced 12" apart on beds 40" apart, and employing two hand feeders and one driver for the tractor, can set out three acres in a nine-hour day. The invention contemplates modification to increase this capacity. Likewise, the planting wheel is about 20" in diameter, and ⅝" thick, and the bearing in which it is carried is vertically adjustable by attaching the horizontal arm of the bracket on top of the frame 37, although further adjustment is contemplated.

The conveyor or feed belt for sweet potato vines is preferably about 17" wide, and with cleats about 8½" apart, and 3" in height, although the dimensions given may be varied to suit the circumstances.

It will be obvious to those skilled in the art that various changes may be made in the invention without departing from the spirit and scope thereof and therefore the invention is not limited by that which is shown in the drawing and described in the specification but only as indicated in the appended claim.

What is claimed is:

An automatic transplanter comprising a vehicle having ground engaging wheels, a frame secured to said vehicle and extending longitudinally thereof, a platform carried by said frame for supporting an operator, an endless conveyor having a substantially vertical portion disposed adjacent the forward end of said frame and a substantially horizontal longitudinally disposed portion located at a height convenient to an operator standing on said platform, a plurality of laterally disposed cleats secured to said conveyor and providing spaces therebetween for the reception of plants one in each space, a substantially vertical guide chute substantially enclosing said vertical portion in close proximity to said cleats, said chute terminating below said frame and in spaced relation to the ground whereby plants will be retained in said spaces during downward movement of said conveyor and uniformly disposed on the ground with the axis of said plants disposed laterally on the path of movement of said vehicle, a ground leveling and smoothing member secured to the forward end of said frame in advance of and a predetermined distance below said chute to facilitate the uniform deposition of plants on the ground, a relatively thin planting wheel yieldably secured to said frame adjacent the rear end thereof and having a smooth peripheral surface constructed and arranged to engage and press the stems of said plants a substantial distance into the ground thereby facilitating proper rooting thereof, and means to drive said conveyor.

GUY P. RUHL.

REFERENCES CITED

The following references are of record in the file of this patent:

UNITED STATES PATENTS

| Number | Name | Date |
| --- | --- | --- |
| 77,802 | Davidson | May 12, 1868 |
| 518,657 | Whitworth | Apr. 24, 1894 |
| 556,588 | Risley | Mar. 17, 1896 |
| 1,222,921 | Bley | Apr. 17, 1917 |
| 1,517,715 | De Geus | Dec. 2, 1924 |
| 1,765,467 | Vollink | June 24, 1930 |
| 1,807,474 | England | May 26, 1931 |
| 1,926,476 | Dekker | Sept. 12, 1933 |
| 2,230,643 | Hershey | Feb. 4, 1941 |

FOREIGN PATENTS

| Number | Country | Date |
| --- | --- | --- |
| 280,547 | Italy | Dec. 12, 1930 |
| 299,485 | Italy | Aug. 4, 1932 |
| 333,614 | Great Britain | Aug. 18, 1930 |